United States Patent [19]

Böhm et al.

[11] Patent Number: 4,530,327

[45] Date of Patent: Jul. 23, 1985

[54] ELECTRIC CONTROL DEVICE FOR FUEL INJECTION PUMPS FOR INTERNAL COMBUSTION ENGINES

[75] Inventors: Martin Böhm, Stuttgart; Manfred Krämer, Schwieberdingen; Reinhard Schwartz, Stuttgart, all of Fed. Rep. of Germany

[73] Assignee: Robert Bosch GmbH, Stuttgart, Fed. Rep. of Germany

[21] Appl. No.: 513,563

[22] Filed: Jul. 14, 1983

[30] Foreign Application Priority Data

Jul. 30, 1982 [DE] Fed. Rep. of Germany ....... 3228513
Mar. 15, 1983 [DE] Fed. Rep. of Germany ....... 3309181

[51] Int. Cl.[3] .............................................. F02M 59/00

[52] U.S. Cl. ................................ 123/357; 123/196 R; 415/90; 184/6.28

[58] Field of Search ................ 123/196 S, 196 R, 357, 123/358, 359; 184/6.28; 415/90

[56] References Cited

U.S. PATENT DOCUMENTS

| | | | |
|---|---|---|---|
| 1,274,105 | 7/1918 | Neuteboom | 123/196 R |
| 2,223,758 | 12/1940 | Dillstrom | 123/503 |
| 2,848,284 | 8/1958 | Atkinson et al. | 123/196 R |
| 2,968,298 | 1/1961 | Meurer | 123/196 R |
| 3,065,822 | 11/1962 | McAfee et al. | 123/196 R |
| 3,324,970 | 6/1967 | McHugh | 415/90 |
| 4,425,889 | 1/1984 | Hachitani | 123/357 |

FOREIGN PATENT DOCUMENTS

| | | | |
|---|---|---|---|
| 1989640 | 7/1968 | Fed. Rep. of Germany | 123/196 R |
| 615310 | 7/1979 | U.S.S.R. | 123/196 R |

*Primary Examiner*—Carl Stuart Miller
*Attorney, Agent, or Firm*—Edwin E. Greigg

[57] ABSTRACT

An electric control device in the form of a final control element for fuel injection pumps for internal combustion engines is protected in the interior of its housing from having the parts it contains inundated by lubricant originating in the interior of the injection pump. This protection is effected in that a suction device driven by the camshaft is disposed in the interior and aspirates lubricant originating in the injection pump and returns it then. The suction device has a rotating part driven by the camshaft, and at its lowest point in the sump it has a sliding shoe which under spring pressure rests at the rear on the rotating part and is so embodied that lubricant adhering to the rotating part reaches a gap and from there is transported back into the injection pump via a drainage hose containing a check valve.

15 Claims, 6 Drawing Figures

10
8
7
26
13
14
32
17
37
15
40
36 39 27 22 19 20
9 11
16
21
12
31
18
23

39
42
30
36
32
41
38
27
51
52
50
53
35
25
31
28
24
26
21

35
27
25
31
28
33
34
29

158
159
150
161
156
140
154
164
157
163
139
155
162
126
121
139
113
110
160
114
117
170
160
118
135
125
115
172
171
176
177
127
V

IV
161
164
140
139
160
113
114
160
130
172
118
134
129
VI
171
125
170
128
176
127
176
172
VI
177
IV
177
177

133
139
113
126
175
121
173
125
174
130
170
177

ELECTRIC CONTROL DEVICE FOR FUEL INJECTION PUMPS FOR INTERNAL COMBUSTION ENGINES

BACKGROUND OF THE INVENTION

The invention is based on an electric control device for fuel injection pumps for internal combustion engines as defined hereinafter. For present-day fuel injection pumps and their regulators, a maintenance-free lubrication system, for instance for engine lubrication, is predominantly used, the pumps being connected to the circulatory lubricant system of the engine. The pump must be sealed as well as possible from the outside to prevent lubricant from escaping. There is no particular difficulty associated with accomplishing this at the point where the camshaft serving to drive the individual pump pistons leaves the pump housing, because the camshaft bearing can be sealed with respect to the housing of an electrical final control element connected to it using the adjusting magnets it contains. However, the regulating rod, which serves to regulate the supply quantity of the injection pump, also extends out of the pump housing in the vicinity of a regulating rod guide means. In this area, it is practically impossible to effect sealing to guard against the escape of lubricant, because the regulating rod has to be easily movable and entirely unhindered in the vicinity of its guide means. If the regulating rod moves with difficulty or sticks, then the regulation process is disturbed and is furthermore unstable. Even when the camshaft bearing is sealed, lubricant from the pump housing enters in small quantities through the regulating rod guide means between the injection pump and the electric final control element, which causes a gradually rising level of oil in the interior of the final control element. Where the injection pump is installed at an extremely oblique angle, the danger exists that moving parts may be inundated by this lubricant and thereby disturbed in their function or blocked entirely.

OBJECT AND SUMMARY OF THE INVENTION

It is the object of the invention to create an electric control device for fuel injection pumps, in particular an electric final control element, in which it is assured that the elements contained in it will not be inundated with the lubricant which unavoidably escapes from the injection pump. The intent is to prevent this inundation with the simplest and cheapest possible means, and as continuously as possible during operation, so that whenever the injection pump is turned off and can cool down, lubricant which may have just escaped will not be present to a great extent or at a damaging level, if in fact it appears at all.

In the electric control device according to the invention, the suction device assures that lubricant which escapes from the injection pump and enters the housing of the final control element is continuously aspirated away during operation and returned to the injection pump. In this manner it is assured that a sump of lubricant cannot even become established to a very high level in the housing of the final control element, that is, to a level such that in the case of extremely oblique positions the result could be an inundation of component parts. The provisions according to the invention result in a particularly simple embodiment for this device, since the drive of the suction pump is provided directly by a drive shaft which is already present and revolving in any event, in particular the camshaft of the injection pump.

According to the invention, a particularly simple, inexpensive and wear-free suction pump is provided. This pump has no moving parts, except for the rotating part, which could be subject to wear. Since the cooperating contact surfaces of the rotating part on the one hand and the stationary surface elements on the other are continuously in contact with lubricant, this continuous lubrication additionally prevents increased wear.

The invention further provides additional advantageous embodiments, which result in a simple and inexpensive pump. As a result of the pressure of the sliding shoes exerted by means of the pressure spring, embodied for instance as a cylindrical spiral spring, a predeterminable pressure force is assured on the one hand, which can also be adjusted. On the other hand, it is advantageous that a self-regulating, rpm-dependent operation of the suction pump is attained, with an automatic limitation of the supply pressure. In other words, if the supply pressure becomes too great, for instance if the rotating part is rotating at excessive speed, then the sliding shoe is pressed away from the rotating part, overcoming the pressure force exerted by the pressure spring, whenever the product of the pressure and the effective surface area exceeds the pressure force exerted.

Further provisions and advantageous embodiments of and improvements to the suction pump in the electric control device defined hereinafter are attainable. The check valve prevents a return flow of oil when the suction pump is off. The suction pump is furthermore self-aspirating.

According to further embodiment, when the injection pump is turned off and if there is poor sealing of the suction device and in particular of the check valve or the outflow line, lubricating oil is prevented from escaping from the injection pump and getting into the final control element. Further, the suction device becomes particularly inexpensive, simple, and easy to assemble.

Particularly advantageous is the embodiment of a one-piece sliding shoe of this kind is very simple and cheap. Since the gap does not absolutely have to be wedge-shaped but in fact a gap which remains uniform in its depth (for instance, having a depth between 0.3 mm and 0.5 mm) will suffice, this one-piece sliding shoe may be embodied as a particularly flat and narrow disk-like part, which is therefore inexpensive and requires extremely little space. It is adantageous for the pressure spring to be placed approximately in the vicinity of the gap, and approximately in the middle thereof, and to be centered on the disk-like part, for example.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
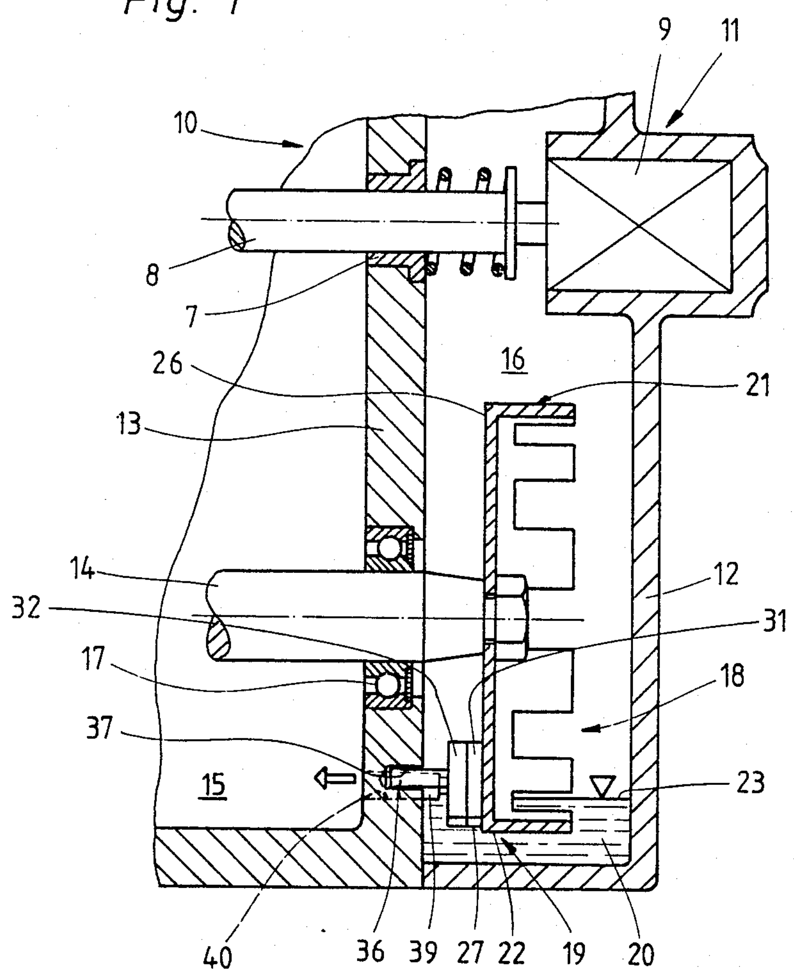
FIG. 1 is a schematic section taken through parts of the housing of a fuel injection pump and a final control element therefor, provided with a suction device according to a first exemplary embodiment.

A final control element 11 is mounted with its housing 12 onto a fuel injection pump 10 which is merely schematically indicated in FIG. 1. The particular details of the fuel injection pump 10 are conventional, so it will not be necessary to show or explain them herein. In a conventional manner, the injection pump 10 has a regulating rod 8 for regulating the supply quantity, which is passed through the pump housing 18 in a regulating rod guide means 7. The regulating rod 8 is actuated by an adjusting magnet 9 which is disposed inside the housing 12 of the final control element 11 and is shown in simplified form. The regulating rod 8 is capable of displacement with as little play and as easily as possible within the regulating rod guide means 7 so that an easy adjustment can be effected, for if the regulating rod 8 were to move with difficulty or to stick, the regulation would be disturbed and would be unstable.

As a rule, for the sake of lubricating its components such as its camshaft 14, which serves to drive the individual pump pistons (not shown), the fuel injection pump 10 is connected to the lubricant circulatory system of the engine, so that lubricant is contained in the interior 15 of the housing 13. The interior 16 of the housing 12 of the final control element 11, by contrast, must be sealed off. Accordingly, the camshaft bearing 17 is sealed off in the conventional manner in the housing 13. However, lubricant still passes through the described regulating rod guide means 7 between the injection pump 10 and the final control element 11 into the interior 16 of the housing 12, although in small quantities, causing the oil level there to rise gradually. Experience has shown that whenever the injection pump 10 is shut off and cooled down when in an extremely oblique position, there may subsequently be starting problems, in the case of cold starting, if the adjusting magnet 9 is inundated with lubricating oil. The reason is that the adjusting forces which the adjusting magnet 9 is capable of bringing to bear are too small in that case for sufficiently rapid actuation of the regulating rod 8.

Figure 2:
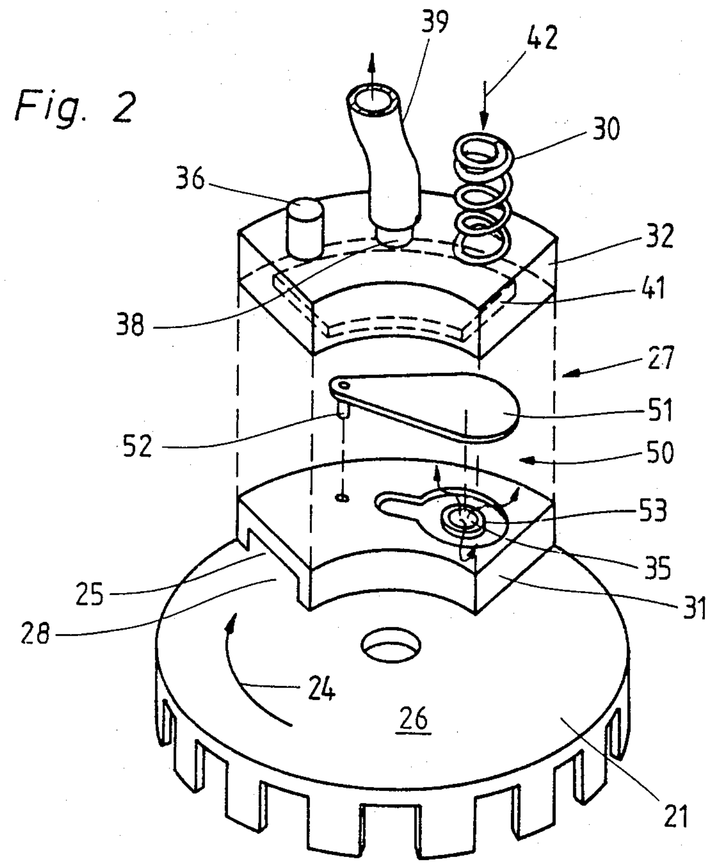
FIG. 2, in schematic form, provides an exploded perspective view of the individual elements of the suction device of FIG. 1.

This kind of inundation of the adjusting magnet 9 by lubricating oil is prevented even in extremely oblique positions in that a suction device 18 is disposed inside the housing 12 of the final control element 11, and any lubricant that has entered from the injection pump 10 is aspirated by this suction device 18 and returned to the interior 15 of the injection pump 10. The suction device 18 has a suction pump 19, which on the intake side communicates with the area 20 near the bottom in the interior 16 and on the compression side communicates with the interior 15 of the housing 13 of the injection pump 10. The suction pump 19 is driven in a particularly simple manner by the camshaft 14 of the injection pump 10. The suction pump 19 has a rotating part, here shown as a pulse wheel 21 of an rpm transducer, which is disposed in a rotationally fixed manner on the camshaft 14 and dips with at least one circumferential section 22, located near the bottom, into the sump 23 of the lubricant which has found its way there. The direction of rotation of the pulse wheel 21 is indicated by the arrow 24 in FIG. 2.

In the vicinity of the circumferential section 22 of the pulse wheel 21 which is disposed near the bottom and dips into the sump 23, and advantageously at the lowest point on the circumference, the suction device 18 has a gap 25, which is formed and defined by an end or rear face 26 of the pulse wheel 21 on one side and by a stationary surface element 27 on the other. The gap 25 tapers in the direction of rotation (arrow 24) of the pulse wheel 21, like a lubricating wedge known in the field of axial pressure bearings, from the open end 28 to the tapering end 29, as is shown particularly clearly in FIG. 3. The surface element 27 disposed on the rear side of the pulse wheel 21 comprises a two-part sliding shoe having two sliding shoe parts 31 and 32, which both have the same contours and size and by way of example are embodied as annular segments. These sliding shoe parts 31 and 32 are joined together, for instance by gluing, and are pressed against the rear face 26 by means of a pressure spring 30. The gap 25 mentioned above is contained inside the sliding shoe part 31 located closed to the pulse wheel 21, and to this end this sliding shoe part 31 has an approximately groove-like indentation of U-shaped cross section on its contact face 33 cooperating with the rear face 26; the depth of this indentation decreases in wedge-like fashion from the open end 28 toward the tapering end 29. The gap 25 discharges in the vicinity of the tapering end 29 into a transversely extending pocket 34 of larger cross section, which in turn communicates with an axially parallel discharge conduit 35.

Both sliding shoe parts 31, 32 are firmly connected to one another in the direction at right angles to the rear face 26 and are guided displaceably in this direction on the housing 13. To this end, one sliding shoe part 32 has at least one guide pin 36, which engages a guide bore 37 toward the housing, on the rear face of this part 32 remote from the pulse wheel 21. Adjacent to the guide pin 36 is a drainage fitting 38, onto which a drainage hose or drainage tube 39 is mounted; this hose or tube 39 leads through a bore 40 in the housing 13 into the interior 15 thereof. On the side oriented toward the pulse wheel 21, the sliding shoe part 32 has a recessed collection chamber 41, which communicates not only with the discharge conduit 35 in the sliding shoe part 31 but also with the drainage line via the drainage fitting 38 having the drainage hose 39.

The suction device 18 has at least one check valve 50, which makes possible only one return line from the interior 16 back to the interior 15 but blocks the passage in the opposite direction. The check valve 50 is located on the compression side of the suction device 18 and opens toward the interior 15. In the illustrated embodiment, the check valve 50 is disposed inside the two-part sliding shoe 31, 32 and is embodied as a flutter valve. This valve has a flutter member 51, which is held between the two sliding shoe parts 31, 32 and controls the discharge from the discharge conduit 35 of one sliding shoe part 31 into the recessed collection chamber 41 of the other sliding shoe part 32. The flutter member 51 is fixed by means of a bolt 52 on the rear side, remote from the pulse wheel 21, of the one sliding shoe part 31. This rear side is cut out in approximately a keyhole shape in the vicinity of the discharge end of the discharge conduit 35, forming an annular sealing face 53 for the flutter member 51.

The operation of the device according to the invention is as follows:

With the rotation of the camshaft 14, lubricating oil escaping from the housing 13 of the injection pump 10 into the interior 16 of the final control element 11 is carried along in the direction of rotation (arrow 24) by means of the pulse wheel 21 rotating with the camshaft, because the lubricating oil adheres to the pulse wheel 21. The lubricant reaches the interior of the gap 25 and collects in the pocket 34. A pressure builds up in the gap 25 which, lifting the flutter member 51 away from the sealing face 53, forces the lubricant out of the discharge conduit 35 into the collection chamber 41 of the sliding shoe part 32. The lubricant passes via the drainage fitting 38 and the drainage hose 39 back into the interior of the injection pump 10. If the supply pressure becomes too great, that is, at an excessively high rpm of the camshaft 14, then the surface element 27 is raised from the rear face 26 of the pulse wheel 21, counter to the action of the pressure spring 30, whenever the product of the oil pressure in the gap 25 and the effective surface area exceeds the pressure forces exerted by the pressure spring 30 in the direction of the arrow 42.

The two sliding shoe parts 31, 32 are advantageously made from extruded plastic parts. The suction device 18 is suitable primarily for small supply quantities and low pressures. It is simple in structure and extraordinarily inexpensive. Since it has no moving parts, except for the pulse wheel 21 rotating with the camshaft, wear in this pump is so low as to be negligible. The embodiment of the check valve 50 is also extraordinarily simple, functionally reliable and favorable in cost. As a result, the positive displacement of lubricants collecting in the gap 25 is enabled on the one hand and tight sealing is assured on the other, both by using simple means. The described suction device 18 prevents the adjusting magnet in the interior 16 of the final control element 11 from possibly being inundated by lubricant (sump 23) even in the case of extremely oblique positions on the part of the injection pump 10 and thus prevents the problems in starting which could otherwise arise.

The selected form and disposition of the sliding shoe parts 31, 32 on the rear face 26 of the pulse wheel 21 represents a particularly space-saving exemplary embodiment, which is also advantageously inexpensive when there is a built-in rpm transducer. Naturally the outer surface of the rotating part which cooperates with the sliding shoe parts 31, 32 can be embodied by one of the end faces or by the jacket face of some arbitrary component which is driven and is connected with the camshaft 14, this component being preferably embodied by way of example in the form of a disk, cylinder, capsule or the like. In the case where contact is effected against a jacket face, the sliding shoe and its gap are embodied such that they are correspondingly curved.

Figure 4:
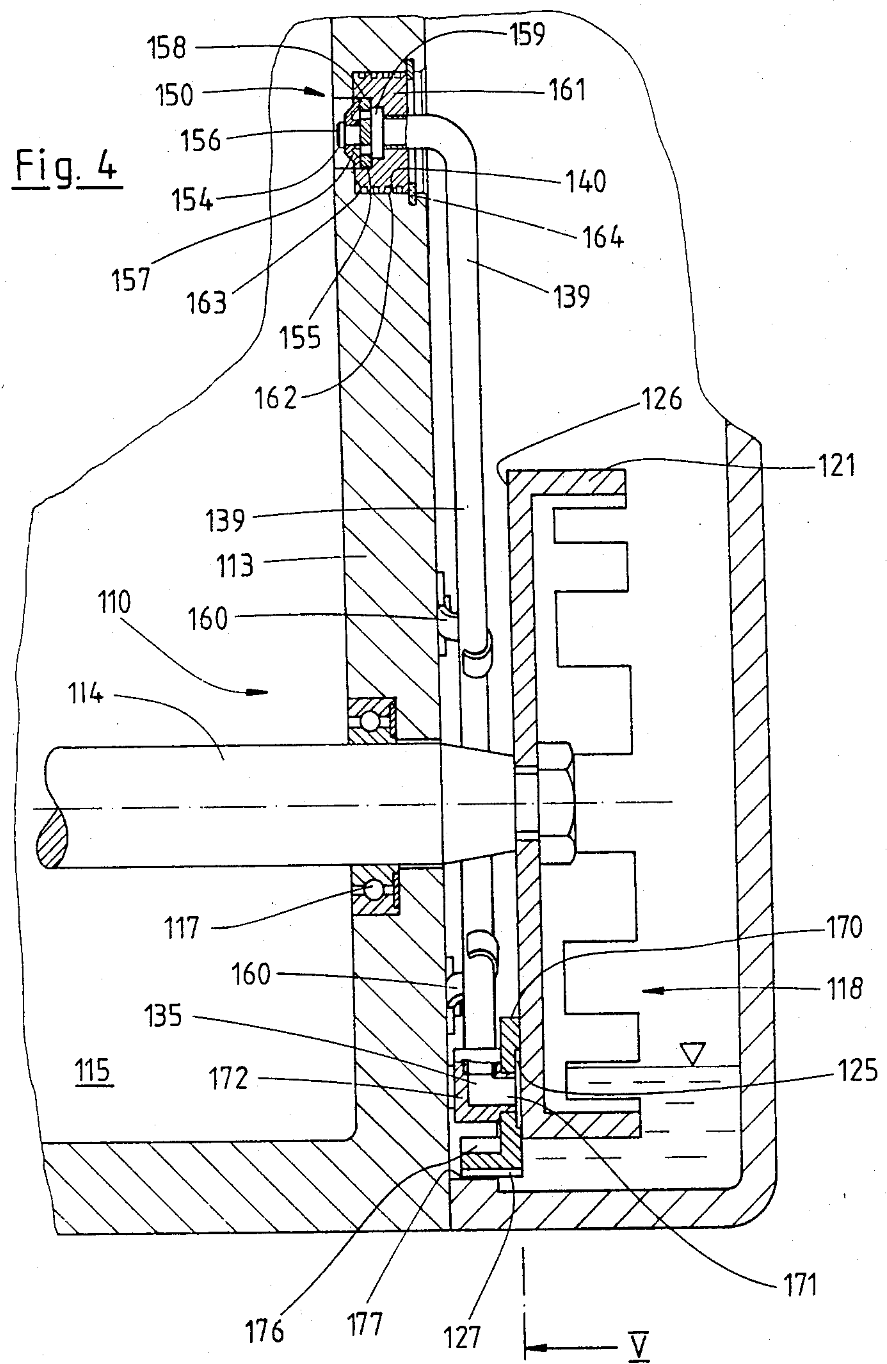
FIG. 4 is a schematic section, corresponding to that of FIG. 1, having a suction device according to a second exemplary embodiment, the section being taken along the line IV—IV of FIG. 5.
Figure 5:
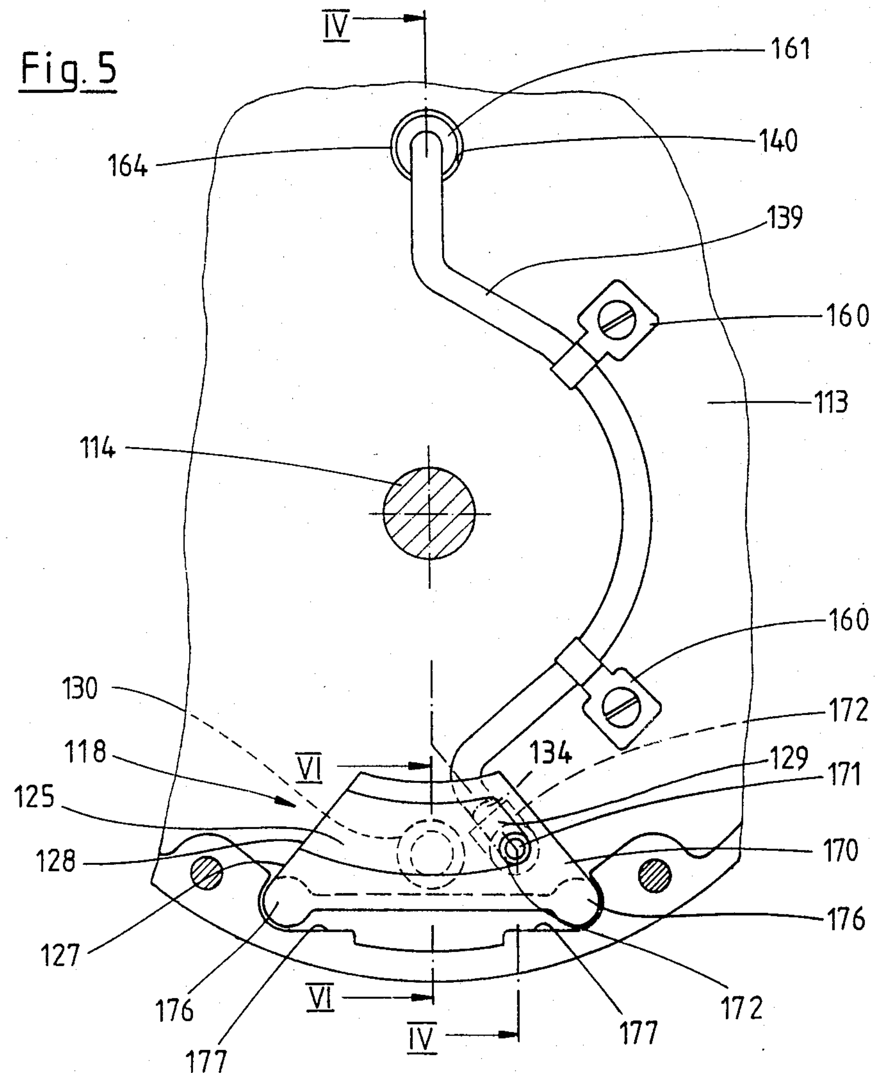
FIG. 5 is a schematic view in the direction of the arrow V in FIG. 4.
Figure 6:
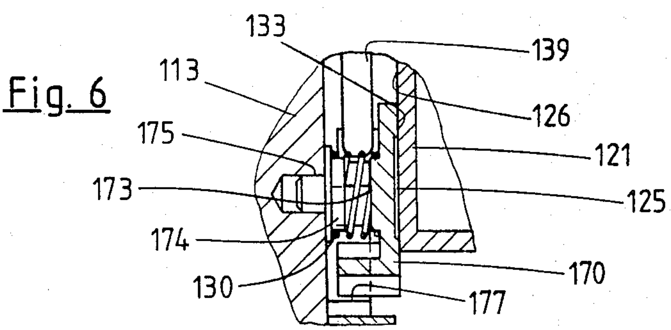
FIG. 6 is a section taken through the sliding shoe along the line VI—VI of FIG. 5.

In the second exemplary embodiment shown in FIGS. 4–6, the parts corresponding to those in the first exemplary embodiment are identified by reference numerals which are greater by 100 than those for the first embodiment, so that repetitions can be avoided by referring to the description of the first exemplary embodiment.

The suction device 118 discharges on the compression side some distance above the camshaft bearing 117 into the interior 115 of the injection pump 110. A bore 140 is contained in the housing 113 at the point of discharge into the interior 115, and a drainage hose 139 leads to this bore 140. The drainage hose 139 begins at the surface element 127, curves around the protruding end of the camshaft 114 and extends upward as far as the bore 140.

The drainage hose 139 is fixed on the housing 113 by means of holding clamps 160. It is made by way of example from a molded part of some plastic material which is elastic and yet still stable in shape at relatively high temperatures. At the discharge end into the interior 115, the drainage hose 139 has a connection plug 161 pushed onto it; this plug 161 is made from a molded plastic part and is secured to the drainage hose 139, for instance by being glued there. The connection plug 161 has a row of annular grooves 162 on its outside, and it is inserted tightly into the bore 140, where the annular grooves 162 together with the bore 140 form a labyrinth seal.

The check valve 150 is located in the vicinity of the discharge into the interior 115 and in this embodiment comprises a rubber mushroom valve 154, which has a perforated disk 155 with a holder pin 156 and an elastic valve plate 157 made of rubber, which is snapped onto the holder pin 156. The valve plate 147 covers the holes in the perforated disk 155, especially in the case of a pressure drop toward the right in FIG. 4. In an opposite direction from this, the valve plate 157 is raised from the perforated disk 155, thereby making the passage accessible. The perforated disk 155 is fitted into an annular groove 158 of the connection plug 161 and fixed therein, for instance by gluing. Between the free end of the drainage hose 139 and the perforated disk 155, there is an interstice 159 in the connection plug 161 for the transfer of the medium. The connection plug 161 rests at the left in FIG. 4 on a shoulder 163 of the housing 113 and is axially secured on the other end by means of a snap ring 164.

In a particularly simple form according to FIGS. 5 and 6 and deviating from the first exemplary embodiment, the surface element 127 which is pressed in an elastically yielding manner against the rear face 126 of the pulse wheel 121 via the pressure spring 130 supported on the housing here comprises a one-piece sliding shoe 170, which is embodied as a molded plastic part and has the shape of a very narrow disk part. The sliding shoe 170 has, on its contact face 133, contains the recessed gap 125 of U-shaped cross section. The gap 125, differing from the first exemplary embodiment, is uniform in terms of the depth of the gap; that is, it is not wedge-shaped. A small gap depth, on the order of magnitude between 0.3 mm and 0.5 mm, has already proved to be sufficient. On the end 129 of the gap 125, which is located opposite the open inlet end 128, the sliding shoe 170 has a bore 171, into which a somewhat angular connection piece 172 of plastic is inserted in particular being glued into place. The connection piece 172 contains the discharge conduit 135 communicating with the gap 125 and is seated at the lower end (in FIG. 4) of the drainage hose 139.

The one-piece sliding shoe 170 is approximately trapezoidal in shape and on the two opposing corners 176 it is encompassed by two guide pockets 177, which form a sliding guideway for the sliding shoe 170.

On the plane of symmetry between the two corners 176, the pressing spring 130 is centered by means of a centering attachment 173. A molded-on protrusion on the housing 113 or a centering pin 174 on the housing may be used for centering, the latter then being inserted into a bore 175.

Figure 3:
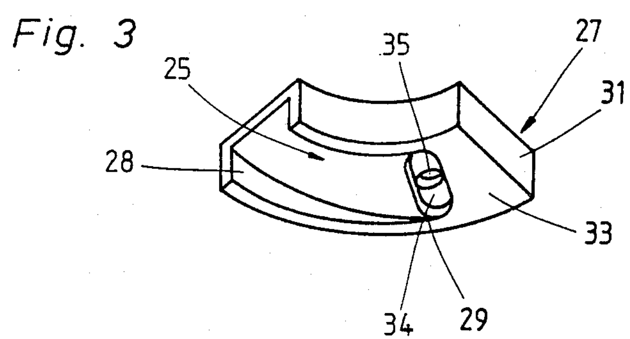
FIG. 3 is a schematic perspective bottom view of a sliding shoe part of the suction device of FIG. 1.

As in the first exemplary embodiment, for instance as shown in FIG. 3, the sliding shoe 170 may be provided on the end 129 of the gap 125 with a pocket 134, indicated by dot-dash lines in FIG. 5, which serves as a collection pocket for the oil which has been aspirated and expressed into the bore 171.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An electric control device for a fuel injection pump for internal combustion engines, in particular an electric final control element having at least one adjusting member located in a housing of said control element acting upon a regulating rod of said fuel injection pump, the improvement comprising a suction means disposed in said housing for aspirating excess lubricant in said housing originating from said injection pump back to said injection pump, wherein said suction means comprises a rotating part having at least one circumferential section contacting the excess lubricant in a sump of the interior of said housing, wherein said suction means, in the vicinity of said circumferential section of said rotating part, dips into said sump at approximately the lowest point on the circumference and has a gap formed by an outer surface of said rotating part on the one side and by a stationary surface element on the other, said gap communicates via a discharge conduit with the interior of said injection pump and is open in the circumferential direction of said rotating part at the opposite end toward said sump, wherein said surface element comprises a sliding shoe means resting on an end face of said rotating part, said sliding shoe means containing said gap, and wherein said sliding shoe means is displaceably guided in a direction approximately at right angles to said end face of said rotating part and is pressed by means of a pressure spring against said end face.

2. An electric control device as defined by claim 1, wherein said rotating part is driven by means of a camshaft of said injection pump.

3. An electric control device as defined by claim 1, wherein said sliding shoe means comprises a contact face cooperating with said rotating part, said contact face having a groove-like recess, preferably U-shaped in cross section, which forms said gap.

4. An electric control device as defined by claim 1, wherein said suction means comprises at least one check valve disposed on the compression side of said suction means and opens toward and communicates with the interior of said injection pump.

5. An electric control device as defined by claim 4, wherein said check valve is disposed between said gap and a drainage line connecting said gap with the interior of said injection pump.

6. An electric control device as defined by claim 5, wherein said check valve is disposed in said sliding shoe means.

7. An electric control device as defined by claim 1, wherein the depth of said gap decreases in an approximate wedge-like fashion in the direction of rotation of said rotating part, and said discharge conduit is provided on the tapering end of said gap.

8. An electric control device as defined by claim 7, wherein said gap discarges, in the vicinity of the tapering end, into a pocket of wider gap cross section communicating with said discharge conduit.

9. An electric control device as defined by claim 4, wherein said suction means discharges on the compression side a distance above the camshaft bearing into the interior of said injection pump.

10. An electric control device as defined by claim 9, wherein said check valve is disposed on the discharge end of a drainage line and at the point where said drainage line discharges into the interior of said injection pump.

11. An electric control device as defined by claim 10, wherein said drainage line comprises a tube means leading from said surface element up to an upper discharge point.

12. An electric control device as defined by claim 10, wherein said drainage line has on its discharge end a connection plug secured thereon and inserted into an opening in the housing of said injection pump.

13. An electric control device as defined by claim 12, wherein said connection plug has, on its free end, a check valve, said valve being provided with a perforated disk and an elastic valve plate secured thereon.

14. An electric control device as defined by claim 9, wherein said surface element comprises a one-piece sliding shoe means comprising a narrow disk part having a recessed gap on one contact face and on which a connection piece of a drainage line which contains said discharge conduit is mounted in the vicinity of that end of said gap which is located opposite the open inlet end of said gap.

15. An electric control device as defined by claim 14, wherein said gap has a gap depth which remains uniform in the direction of rotation of said rotating part.

* * * * *